US012198850B2

(12) United States Patent
Nishiura et al.

(10) Patent No.: US 12,198,850 B2
(45) Date of Patent: Jan. 14, 2025

(54) STATIONARY INDUCTION APPARATUS

(71) Applicant: Mitsubishi Electric Corporation, Tokyo (JP)

(72) Inventors: Ryuichi Nishiura, Tokyo (JP); Kazuaki Aono, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 764 days.

(21) Appl. No.: 17/424,942

(22) PCT Filed: Mar. 27, 2019

(86) PCT No.: PCT/JP2019/013203
§ 371 (c)(1),
(2) Date: Jul. 22, 2021

(87) PCT Pub. No.: WO2020/194580
PCT Pub. Date: Oct. 1, 2020

(65) Prior Publication Data
US 2022/0093326 A1 Mar. 24, 2022

(51) Int. Cl.
*H01F 27/36* (2006.01)

(52) U.S. Cl.
CPC .................................... *H01F 27/36* (2013.01)

(58) Field of Classification Search
CPC ....... H01F 27/36; H01F 27/361; H01F 27/366
USPC .............................................. 336/84 R, 84 M
See application file for complete search history.

(56) References Cited

U.S. PATENT DOCUMENTS

2015/0371769 A1* 12/2015 Imura ..................... H01F 27/36 336/84 M
2019/0086726 A1* 3/2019 Dong .................... H01S 5/2202

FOREIGN PATENT DOCUMENTS

JP S6057115 U 4/1985
JP S60-219717 A * 11/1985
JP 5010055 B1 * 8/2012 ........... H01F 27/365

OTHER PUBLICATIONS

International Search Report (PCT/ISA/210) with translation and Written Opinion (PCT/ISA/237) mailed on Jun. 25, 2019, by the Japan Patent Office as the International Searching Authority for International Application No. PCT/JP2019/013203.

* cited by examiner

*Primary Examiner* — Tuyen T Nguyen
(74) *Attorney, Agent, or Firm* — Buchanan Ingersoll & Rooney PC

(57) ABSTRACT

A plurality of magnetic shields are arranged to be aligned in an axial direction with a gap there between. Each of a plurality of magnetic shields is formed with a plurality of electromagnetic steel plates stacked in a direction vertical to each of the axial direction and a normal direction to a shield support surface. The shortest spacing distance between each of a plurality of magnetic shields and a support is twice or more the length of the gap between magnetic shields adjacent to each other in a plurality of magnetic shields.

8 Claims, 7 Drawing Sheets

STATIONARY INDUCTION APPARATUS

TECHNICAL FIELD

The present invention relates to a stationary induction apparatus.

BACKGROUND ART

Japanese Utility Model Laying-Open No. S60-057115 (PTL 1) discloses a configuration of a stationary induction apparatus. The stationary induction apparatus disclosed in PTL 1 includes a magnetic shield structure. In the magnetic shield structure, shield plates are provided to face coils on a tank inner wall surface. The shield plates are formed by stacking a plurality of silicon steel plates each having a length longer than the coil stack length and a lateral width shorter than the coil diameter. On upper and lower end sides of the shield plate serving as at least an inflow section and an outflow section of magnetic flux, a plurality of slits or grooves in the up-down direction, which are deeper than the penetration depth of magnetic flux, are formed along the width direction.

CITATION LIST

Patent Literature

PTL 1: Japanese Utility Model Laying-Open No. S60-057115

SUMMARY OF INVENTION

Technical Problem

In the conventional stationary induction apparatus, eddy current is produced by leakage flux incident from the stacking direction of the electromagnetic steel plates that constitute the magnetic shield. This eddy current causes heating of the electromagnetic steel plates and then increases the temperature of the stationary induction apparatus.

The present invention is made in view of the problem above and an object of the present invention is to suppress heating of electromagnetic steel plates due to eddy current produced in the electromagnetic steel plates that constitute a magnetic shield and to suppress temperature increase of a stationary induction apparatus.

Solution to Problem

A stationary induction apparatus based on the present invention includes a core, a winding, a support, and a plurality of magnetic shields. The winding is wound around the core as a center axis. The support is formed of a nonmagnetic material and extends between the winding and the core in an axial direction of the center axis and supports the core. Each of the magnetic shields is positioned between the winding and the support on an opposite side to a side closer to the core of the support. The support has a shield support surface positioned on the opposite side to the side closer to the core. On the shield support surface, a plurality of fixing portions that fix the magnetic shields are provided to be spaced apart from each other in the axial direction. Each of the fixing portions is formed of a nonmagnetic material. The magnetic shields are arranged to be aligned in the axial direction with a gap therebetween. Each of the magnetic shields is formed with a plurality of electromagnetic steel plates stacked in a direction vertical to each of the axial direction and a normal direction to the shield support surface. A shortest spacing distance between each of the magnetic shields and the support is twice or more a length of the gap between magnetic shields adjacent to each other in the magnetic shields.

Advantageous Effects of Invention

The present invention can shorten a current path of eddy current produced by leakage flux incident on the electromagnetic steel plate in the stacking direction of the electromagnetic steel plates. Accordingly, heating of the electromagnetic steel plate can be suppressed. Furthermore, leakage flux incident on the electromagnetic steel plate can be suppressed from leaking from the gap between the electromagnetic steel plates adjacent to each other and passing through the support, in the axial direction of the core. Accordingly, heating of the support can be suppressed. Consequently, temperature increase of the stationary induction apparatus can be suppressed.

DESCRIPTION OF EMBODIMENTS

Figure 1:
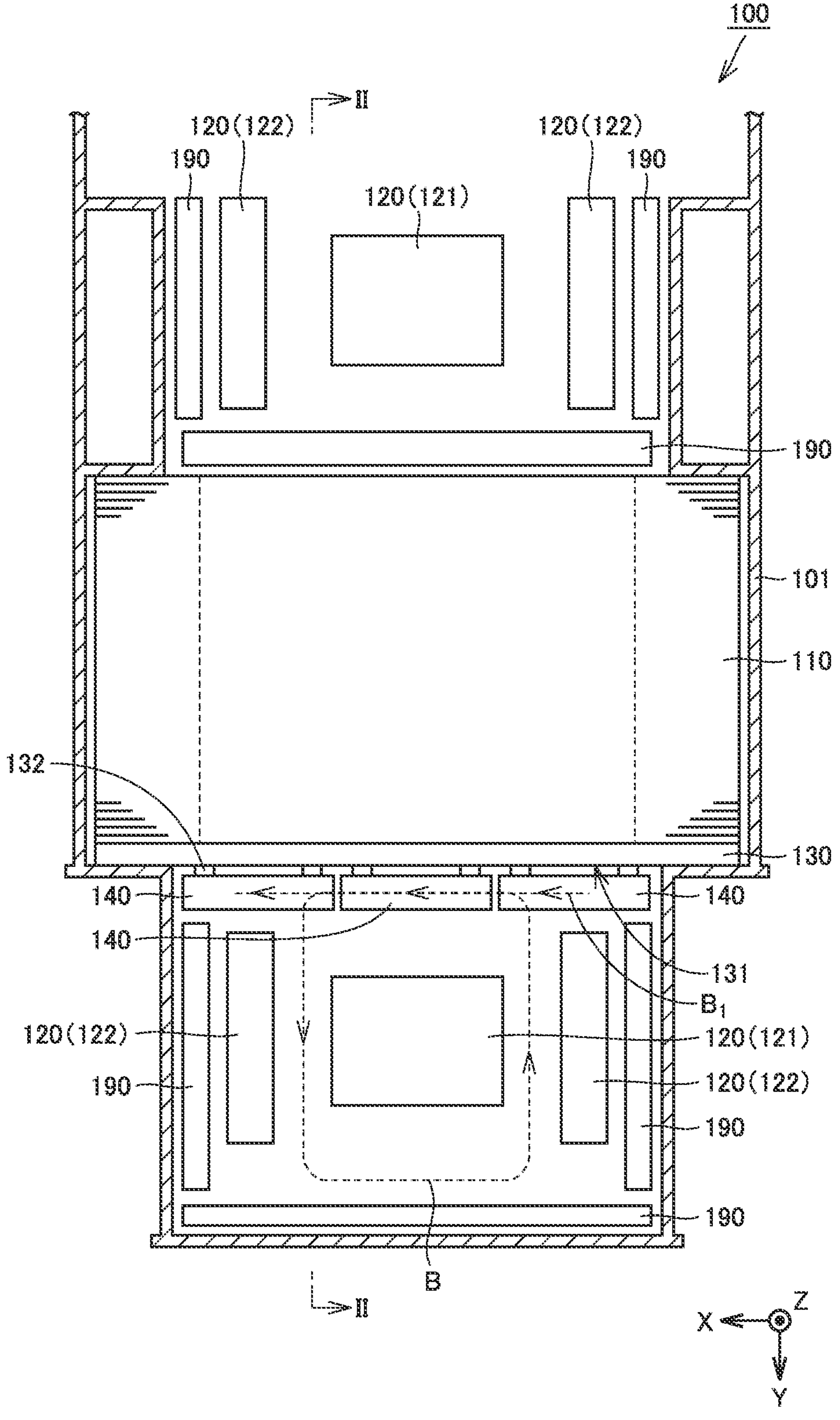
FIG. 1 is a diagram showing a configuration of a stationary induction apparatus according to a first embodiment of the present invention.

A stationary induction apparatus according to embodiments of the present invention will be described below with reference to the drawings. In the following description of embodiments, like or corresponding parts in the drawings are denoted by like reference signs and a description thereof will not be repeated. In the following embodiments, a transformer will be described as a stationary induction apparatus. However, the stationary induction apparatus is not limited to a transformer and may be a reactor or the like.

First Embodiment

Figure 2:
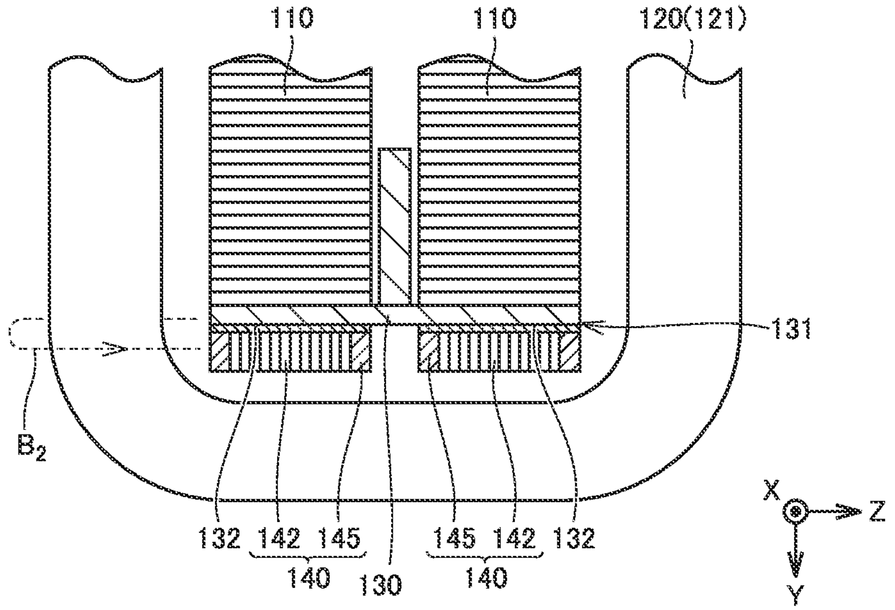
FIG. 2 is a partial cross-sectional view of the stationary induction apparatus shown in FIG. 1 as viewed from the direction of arrow II-II.

FIG. 1 is a diagram showing a configuration of a stationary induction apparatus according to a first embodiment of the present invention. FIG. 2 is a partial cross-sectional view of the stationary induction apparatus in FIG. 1 as viewed from the direction of arrow II-II.

As shown in FIG. 1 and FIG. 2, a stationary induction apparatus 100 according to the first embodiment of the present invention includes a core 110, a winding 120, a support 130, and a plurality of magnetic shields 140. Stationary induction apparatus 100 includes a high voltage winding 121 and a low voltage winding 122 as winding 120.

As shown in FIG. 1 and FIG. 2, winding 120 is wound around core 110 as the center axis. Specifically, high voltage winding 121 and low voltage winding 122 are concentrically wound around a main leg of core 110 as the center axis. That is, stationary induction apparatus 100 according to the first embodiment is a shell-type transformer.

Stationary induction apparatus 100 further includes a tank 101. The tank is filled with insulating oil or insulating gas that is an insulating medium and a cooling medium. For example, mineral oil, ester oil, or silicone oil is used as the insulating oil. For example, $SF_6$ gas or dry air is used as the insulating gas. Core 110, high voltage winding 121, and low voltage winding 122 are accommodated in the tank.

Tank 101 includes a lower tank and an upper tank arranged above the lower tank. The lower tank has a flange, and the upper tank rests on the flange. The lower tank and the upper tank are welded and formed to be integrated.

High voltage winding 121 is positioned with respect to low voltage winding 122 such that high voltage winding 121 is sandwiched between low voltage windings 122 in the axial direction X of the center axis.

As shown in FIG. 1 and FIG. 2, support 130 extends between winding 120 and core 110 in the axial direction X of the center axis and supports core 110. As shown in FIG. 1, support 130 rests on the flange of tank 101 on both ends in the axial direction X.

Support 130 has a shield support surface 131 positioned on the opposite side to the side closer to core 110. On shield support surface 131, a plurality of fixing portions 132 that fix a plurality of magnetic shields 140 are provided to be spaced apart from each other in the axial direction X.

Support 130 is formed of a nonmagnetic material. Support 130 is formed of, for example, nonmagnetic stainless steel. Each of a plurality of fixing portions 132 is formed of a nonmagnetic material. Each of a plurality of fixing portions 132 is formed of, for example, stainless steel.

Figure 3:
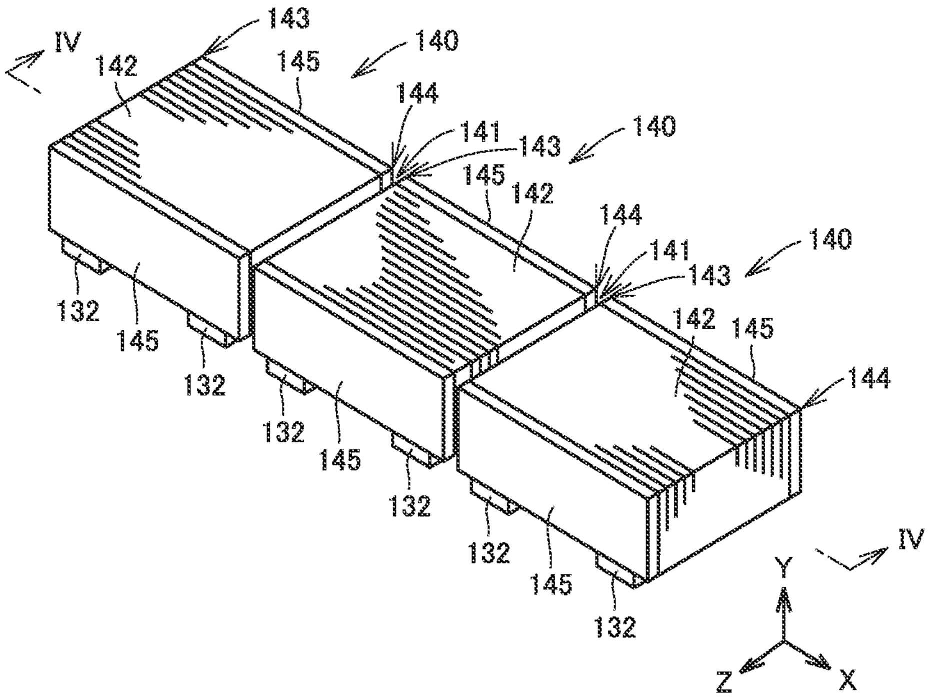
FIG. 3 is a perspective view showing a plurality of magnetic shields and a plurality of fixing portions in the stationary induction apparatus according to the first embodiment of the present invention.
Figure 4:
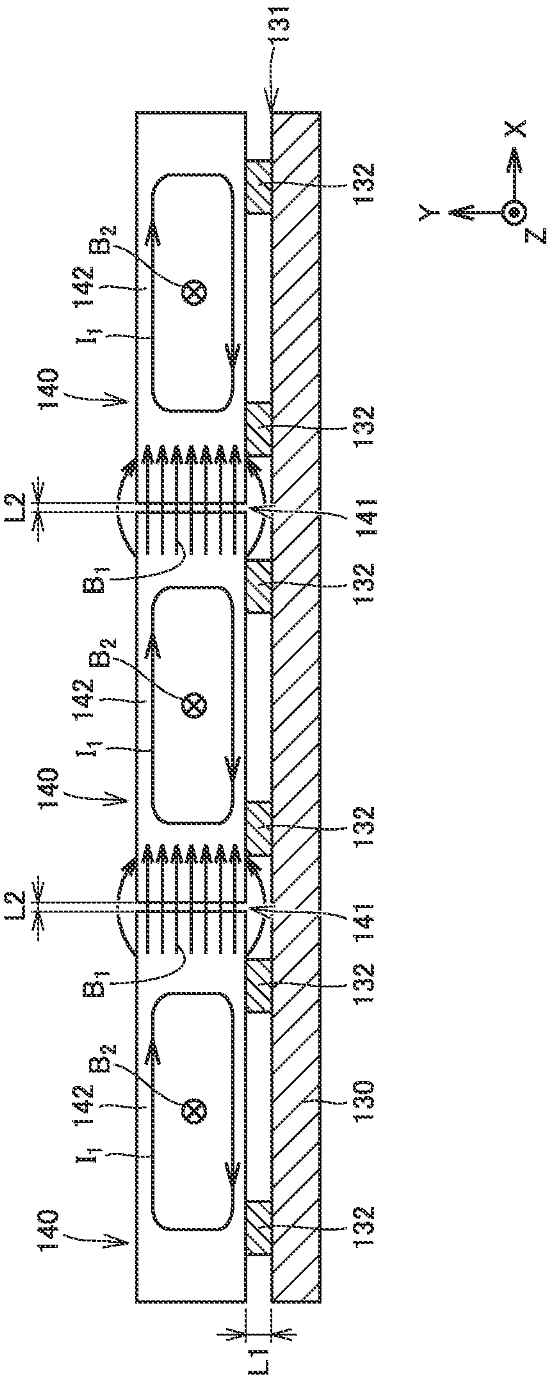
FIG. 4 is a cross-sectional view of a plurality of magnetic shields and a plurality of fixing portions shown in FIG. 3 as viewed from the direction of arrow IV-IV.

FIG. 3 is a perspective view showing a plurality of magnetic shields and a plurality of fixing portions in the stationary induction apparatus according to the first embodiment of the present invention. FIG. 4 is a cross-sectional view showing a plurality of magnetic shields and a plurality of fixing portions shown in FIG. 3 as viewed from the direction of arrow IV-IV. In FIG. 4, support 130 is also partially shown.

As shown in FIG. 1 and FIG. 2, each of a plurality of magnetic shields 140 is positioned between winding 120 and support 130 on the opposite side to the side closer to core 110 of support 130. As shown in FIG. 3, a plurality of magnetic shields 140 are arranged to be aligned in the axial direction X with a gap 141 therebetween. Stationary induction apparatus 100 according to the present embodiment includes three magnetic shields 140 having an identical configuration. Each of a plurality of magnetic shields 140 has one end 143 and the other end 144 in the axial direction X.

As shown in FIG. 1, stationary induction apparatus 100 according to the first embodiment includes a plurality of other magnetic shields 190 facing winding 120 at a different position from that of a plurality of magnetic shields 140. The other magnetic shields 190 are directly bonded to tank 101 or core 110, or bonded to tank 101 or core 110 only through fixing portions.

As shown in FIG. 2 and FIG. 3, each of a plurality of magnetic shields 140 is formed with a plurality of electromagnetic steel plates 142 stacked in a direction vertical to each of the axial direction X and the normal direction Y to shield support surface 131. Each of a plurality of magnetic shields 140 is formed with electromagnetic steel plates 142 and thus has a higher permeability compared with support 130 and each of a plurality of fixing portions 132 formed of a nonmagnetic material. Leakage flux therefore is easily concentrated on magnetic shield 140 compared with support 130 and each of a plurality of fixing portions 132.

As shown in FIG. 2 and FIG. 3, in each of a plurality of magnetic shields 140, a pair of conductive walls 145 each having a layer thickness greater than that of electromagnetic steel plate 142 are stacked on both ends in the stacking direction Z of the electromagnetic steel plates. In the present embodiment, when viewed from the stacking direction Z, the outer shape of each of a pair of conductive walls 145 is the same as the outer shape of electromagnetic steel plate 142.

As shown in FIG. 2 and FIG. 3, in the stacking direction Z of a plurality of electromagnetic steel plates 142, each of a plurality of fixing portions 132 extends across the entire length of each of a plurality of magnetic shields 140 and fixes a plurality of electromagnetic steel plates 142 to each other by welding.

As shown in FIG. 2 to FIG. 4, each of a plurality of magnetic shields 140 is fixed to shield support surface 131 by at least two fixing portions 132 aligned in the axial direction X as a plurality of fixing portions 132. In the present embodiment, each of a plurality of magnetic shields 140 is fixed to shield support surface 131 by two fixing portions 132.

As shown in FIG. 4, the shortest spacing distance L1 between each of a plurality of magnetic shields 140 and support 130 is twice or more the length L2 of gap 141 between magnetic shields 140 adjacent to each other in a plurality of magnetic shields 140. The shortest spacing distance L1 is, for example, 2 mm or less, and the length of gap 141 is, for example, 5 mm.

Leakage flux in stationary induction apparatus 100 according to the present embodiment will now be described. As shown in FIG. 1, in the present embodiment, for example, leakage flux B is produced, which passes through between high voltage winding 121 and low voltage winding 122 and surrounds high voltage winding 121 so as not to reach core 110. This leakage flux B and the like is incident on a plurality of magnetic shields 140 to become first leakage flux $B_1$ passing through a plurality of magnetic shields 140 in the axial direction X.

Furthermore, as shown in FIG. 2, in the present embodiment, apart from first leakage flux $B_1$, second leakage flux $B_2$ passing through between high voltage winding 121 and low voltage winding 122 is produced. The magnetic line of second leakage flux $B_2$ is annular when viewed from the normal direction Y. Second leakage flux $B_2$ is incident on magnetic shield 140 from the stacking direction Z, for a plurality of magnetic shields 140.

As shown in FIG. 4, second leakage flux $B_2$ produces first eddy current $I_1$ that forms an annular path when viewed from the stacking direction Z in electromagnetic steel plate 142. Here, since stationary induction apparatus 100 according to the present embodiment includes a plurality of magnetic shields 140 as the magnetic shield, the area of the electromagnetic steel plate when viewed from the stacking direction Z is smaller compared with when the magnetic shield is formed with one magnetic shield. Thus, the current path of first eddy current $I_1$ produced by second leakage flux $B_2$ can be shortened.

Furthermore, as shown in FIG. 4, in stationary induction apparatus 100 according to the first embodiment of the present invention, when first leakage flux $B_1$ passes through the gap 141, first leakage flux $B_1$ partially leaks from electromagnetic steel plate 142 to the side closer to support 130 than gap 141 or the opposite side to the side closer to support 130 and thereafter is incident on electromagnetic steel plate 142 again.

Here, since the shortest spacing distance L1 is twice or more the length L2 of gap 141, first leakage flux $B_1$ leaking to the side closer to support 130 than gap 141 can be suppressed from passing through support 130. Accordingly, heating of support 130 due to passage of first leakage flux $B_1$ through support 130 can be suppressed.

Furthermore, in each a plurality of magnetic shields 140 and a plurality of fixing portions 132, second eddy current is produced, which has a path different from first eddy current $I_1$ caused by second leakage flux $B_2$. This second eddy current will be described below.

Figure 5:
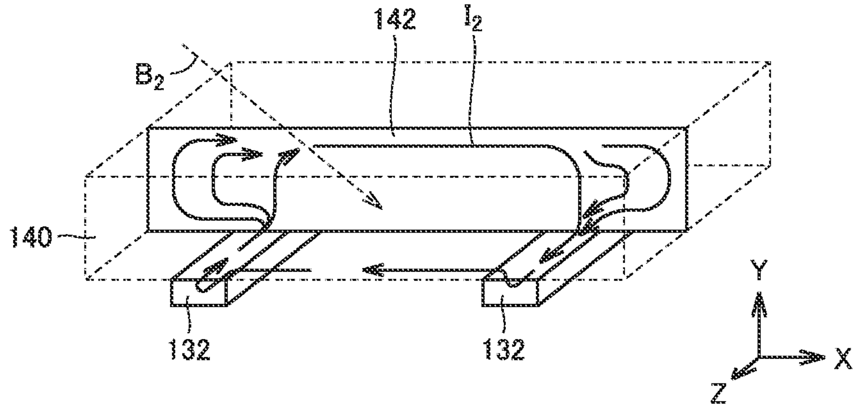
FIG. 5 is a diagram schematically showing a path of second eddy current flowing through each of the magnetic shield and the fixing portion in the stationary induction apparatus according to the first embodiment of the present invention.
Figure 6:
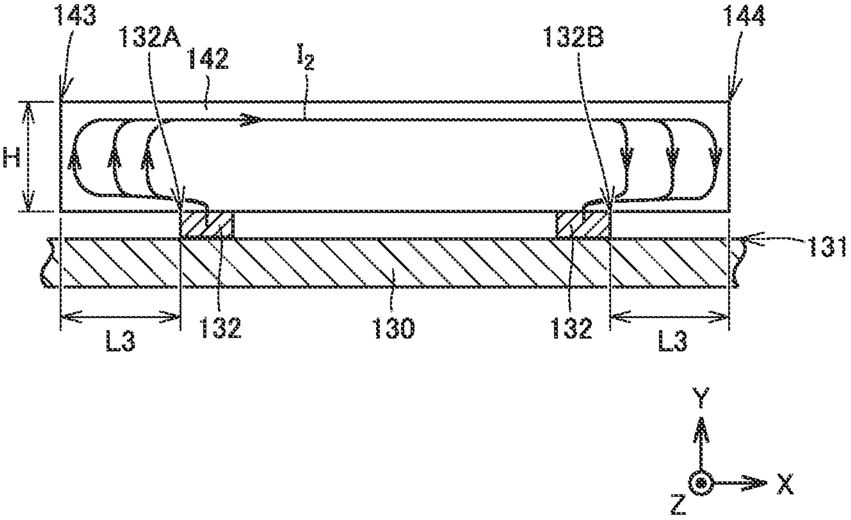
FIG. 6 is a diagram schematically showing a path of second eddy current when viewed from the stacking direction of electromagnetic steel plates in the stationary induction apparatus according to the first embodiment of the present invention.

FIG. 5 is a diagram schematically showing a path of second eddy current flowing through each of the magnetic shield and the fixing portion in the stationary induction apparatus according to the first embodiment of the present invention. FIG. 6 is a diagram schematically showing a path of second eddy current when viewed from the stacking direction of electromagnetic steel plates in the stationary induction apparatus according to the first embodiment of the present invention. In FIG. 6, the outer shape of magnetic shield 140 is depicted by dotted lines. In FIG. 6, only one of electromagnetic steel plates 142 included in magnetic shield 140 is shown.

As shown in FIG. 5 and FIG. 6, second leakage flux $B_2$ may sometimes be incident on the magnetic shield from a direction inclined relative to the stacking direction Z. In this case, second eddy current $I_2$ is produced, in which both of electromagnetic steel plate 142 and fixing portion 132 serve as a current path. Second eddy current $I_2$ flows through one of electromagnetic steel plates 142 included in magnetic shield 140 along the axial direction X and thereafter flows toward fixing portion 132 that fixes this electromagnetic steel plate 142. Next, as shown in FIG. 5, second eddy current $I_2$ flows through fixing portion 132 along the stacking direction Z and thereafter flows through not-shown another electromagnetic steel plate along the axial direction X. Then, second eddy current $I_2$ flows through another fixing portion 132 toward the above-noted electromagnetic steel plate 142 along the stacking direction Z and thereafter flows into electromagnetic steel plate 142 again. Second eddy current $I_2$ has an annular current path as described above.

In the present embodiment, as shown in FIG. 6, the dimension of the length L3 between one end 143 and a side surface 132A on the side closer to one end 143 in fixing portion 132 positioned closest to one end 143 of at least two fixing portions 132 in the axial direction X is greater than the dimension of the height H of each of a plurality of magnetic shields 140 in the normal direction Y to shield support surface 131. Furthermore, the dimension of the length L3 between the other end 144 and a side surface 132B on the side closer to the other end 144 in fixing portion 132 positioned closest to the other end 144 of at least two fixing portions 132 in the axial direction X is greater than the dimension of the height H of each of a plurality of magnetic shields 140 in the normal direction Y to shield support surface 131.

It is preferable that each of a plurality of fixing portions 132 is arranged as near one end 143 or the other end 144 as possible in order to stably fix each of a plurality of electromagnetic steel plates 142. However, in the present embodiment, the dimension of the length L3 is purposefully greater than the dimension of the height H so that the path of second eddy current $I_2$ has a distribution. Specifically, as shown in FIG. 6, second eddy current $I_2$ has a distribution on each of the outside of fixing portion 132 positioned closest to one end 143 in the axial direction X and the outside of fixing portion 132 positioned closest to the other end 144 in the axial direction X on electromagnetic steel plate 142.

In the present embodiment, since the path of second eddy current $I_2$ has a distribution, the heating density of electromagnetic steel plate 142 by second eddy current $I_2$ can be reduced. Thus, local temperature increase in stationary induction apparatus 100 can be suppressed.

The position of gap 141 in a plurality of magnetic shields 140 as a whole in the first embodiment of the present invention will now be described.

As shown in FIG. 4, in embodiments of the present invention, in view of shortening the path of first eddy current $I_1$, it is preferable that gaps 141 are arranged in a plurality of magnetic shields 140 as a whole such that the area of electromagnetic steel plate 142 is reduced when viewed from the stacking direction Z. However, if gap 141 is formed in a place where the magnetic flux density of first leakage flux $B_1$ that is the main leakage flux passing through the magnetic shield 140 is high, first leakage flux $B_1$ is more likely to leak from the gap 141 to support 130 and the like.

Figure 7:
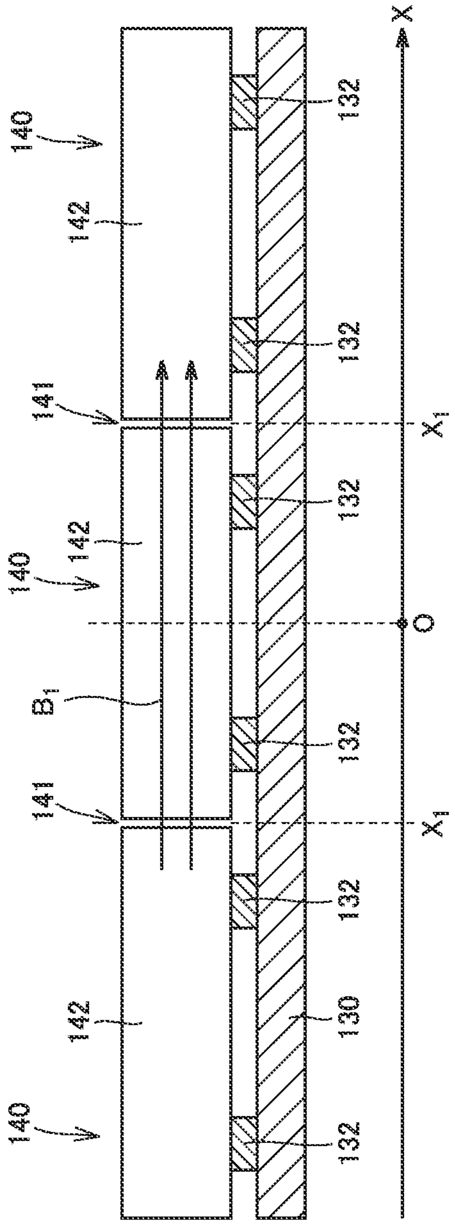
FIG. 7 is a diagram showing a relative position of a gap with respect to a central position of a plurality of magnetic shields as a whole in the axial direction in the stationary induction apparatus according to the first embodiment of the present invention.
Figure 8:
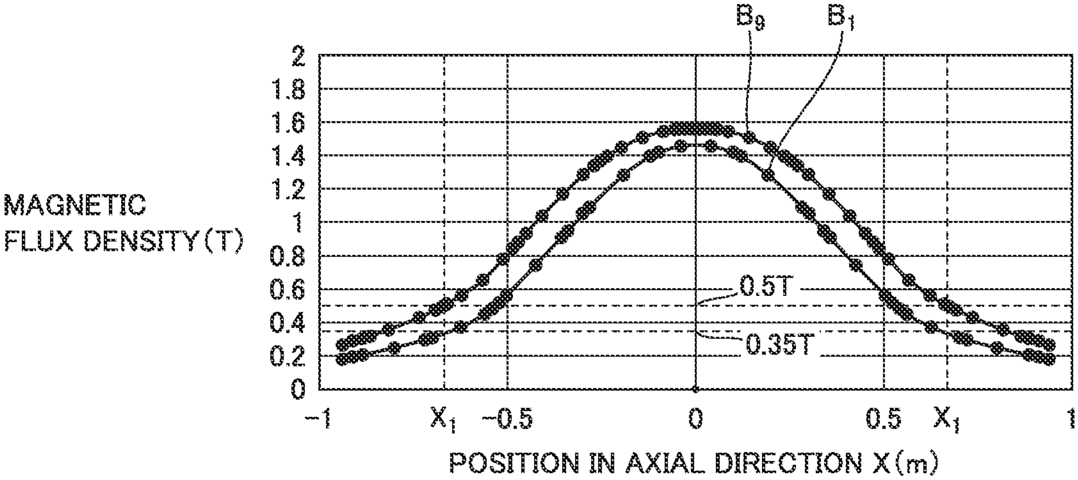
FIG. 8 is a graph showing the result of analysis of change in magnetic flux density in the axial direction of first leakage flux passing through a plurality of magnetic shields and the gap between a plurality of magnetic shields in the stationary induction apparatus according to the first embodiment of the present invention.

FIG. 7 is a diagram showing a relative position of the gap with respect to a central position of plurality of magnetic shields as a whole in the axial direction in the stationary induction apparatus according to the first embodiment of the present invention. FIG. 8 is a graph showing the result of analysis of change in magnetic flux density in the axial direction of first leakage flux passing through a plurality of magnetic shields and the gap between a plurality of magnetic shields in the stationary induction apparatus according to the first embodiment of the present invention. In FIG. 8, the center position O of a plurality of magnetic shields 140 as a whole in the axial direction X is denoted as the origin of coordinates.

As shown in FIG. 7 and FIG. 8, in the present embodiment, the magnetic flux density of first leakage flux $B_1$ is highest at the center position O of a plurality of magnetic shields 140 as a whole. Furthermore, at the position $X_1$ of gap 141 in the axial direction X, gap 141 is arranged at a position where the magnetic flux density is 0.5 T or less. More specifically, at the position $X_1$ of gap 141 in the axial direction X, gap 141 is arranged at a position where the magnetic flux density is 0.35 T or less.

In this way, a plurality of magnetic shields 140 are configured such that the magnetic flux density of a magnetic field passing through gap 141 between magnetic shields 140 adjacent to each other in a plurality of magnetic shields 140 in the axial direction X is 0.5 T or less. It is more preferable that a plurality of magnetic shields 140 are configured such that the magnetic flux density of a magnetic field passing through gap 141 in the axial direction X is 0.35 or less.

Here, FIG. 8 shows the magnetic flux density of first leakage flux $B_9$ in a stationary induction apparatus according to a comparative example. The stationary induction apparatus according to the comparative example differs from stationary induction apparatus 100 according to the first embodiment of the present invention only in that a magnetic shield is formed in an integrated manner. The length in the axial direction X of the magnetic shield in the comparative example is equal to the length in the axial direction X of a plurality of magnetic shields 140 as a whole in the first embodiment of the present invention.

When the intensity of the magnetic flux density of first leakage flux $B_1$ in the present embodiment is compared with the intensity of the magnetic flux density of first leakage flux $B_9$ in the comparative example, the tendency of change in magnetic flux density in the axial direction X is substantially the same. This shows that, in the present embodiment, first leakage flux $B_1$ is suppressed from leaking from gap 141 to the side closer to support 130 than electromagnetic steel plate 142 or the opposite side to support 130.

As described above, stationary induction apparatus 100 according to the first embodiment of the present invention includes core 110, winding 120, support 130, and a plurality of magnetic shields 140. Winding 120 is wound around core 110 as the center axis. Support 130 is formed of a nonmagnetic material and extends between winding 120 and core 110 in the axial direction X of the center axis to support core 110. Each of a plurality of magnetic shields 140 is positioned between winding 120 and support 130 on the opposite side to the side closer to core 110 of support 130. Support 130 has shield support surface 131 positioned on the opposite side to the side closer to core 110. On shield support surface 131, a plurality of fixing portions 132 that fix a plurality of magnetic shields 140 are provided to be spaced apart from each other in the axial direction X. Each of a plurality of fixing portions 132 is formed of a nonmagnetic material. A plurality of magnetic shields 140 are arranged to be aligned in the axial direction X with a gap 141 therebetween. Each of a plurality of magnetic shields 140 is formed with a plurality of electromagnetic steel plates 142 stacked in a direction vertical to each of the axial direction X and the normal direction Y to shield support surface 131. The shortest spacing distance L1 between each of a plurality of magnetic shields 140 and support 130 is twice or more the length L2 of gap 141 between magnetic shields 140 adjacent to each other in a plurality of magnetic shields 140.

Thus, the current path of first eddy current $I_1$ produced by second leakage flux $B_2$ incident on electromagnetic steel plate 142 in the stacking direction Z of electromagnetic steel plates 142 can be shortened. Accordingly, heating of electromagnetic steel plates 142 can be suppressed. Furthermore, in the axial direction X, first leakage flux $B_1$ incident on electromagnetic steel plate 142 can be suppressed from leaking from electromagnetic steel plate 142 and passing through support 130. Accordingly, heating of support 130 can be suppressed. As described above, temperature increase of stationary induction apparatus 100 can be suppressed.

In stationary induction apparatus 100 according to the first embodiment of the present invention, each of a plurality of fixing portions 132 extends across the entire length of each of a plurality of magnetic shields 140 in the stacking direction Z of a plurality of electromagnetic steel plates 142 and fixes a plurality of electromagnetic steel plates 142 to each other. Each of a plurality of magnetic shields 140 has one end 143 and the other end 144 in the axial direction X. Each of a plurality of magnetic shields 140 is fixed to shield support surface 131 by at least two fixing portions 132 aligned in the axial direction X as a plurality of fixing portions 132. The dimension of the length L3 between one end 143 and side surface 132A on the side closer to one end 143 in fixing portion 132 positioned closest to one end 143 of at least two fixing portions 132 in the axial direction X is greater than the dimension of the height H of each of a plurality of magnetic shields 140 in the normal direction Y to shield support surface 131. The dimension of the length between the other end 144 and side surface 132B on the side closer to the other end 144 in fixing portion 132 positioned closest to the other end 144 of at least two fixing portions 132 in the axial direction X is greater than the dimension of the height of each of a plurality of magnetic shields 140 in the normal direction Y to shield support surface 131.

With this configuration, since the path of second eddy current $I_2$ formed by a plurality of electromagnetic steel plates 142 and a plurality of fixing portions 132 has a distribution, the heating density of electromagnetic steel plate 142 by second eddy current $I_2$ can be reduced. Consequently, local temperature increase in stationary induction apparatus 100 can be suppressed.

In stationary induction apparatus 100 according to the first embodiment of the present invention, a plurality of magnetic shields 140 are configured such that the magnetic flux density of a magnetic field passing through gap 141 between magnetic shields 140 adjacent to each other in a plurality of magnetic shields 140 in the axial direction X is 0.5 T or less.

This configuration further suppresses first leakage flux $B_1$ from leaking from gap 141 to the side closer to support 130 than electromagnetic steel plate 142 or the opposite side to support 130 and shortens the current path of eddy current by second leakage flux $B_2$.

Second Embodiment

A stationary induction apparatus according to a second embodiment of the present invention will now be described. The stationary induction apparatus according to the second embodiment of the present invention differs from stationary induction apparatus 100 according to the first embodiment of the present invention in that an insulating member is positioned in the gap, and a configuration similar to the stationary induction apparatus according to the first embodiment of the present invention will not be repeated.

Figure 9:
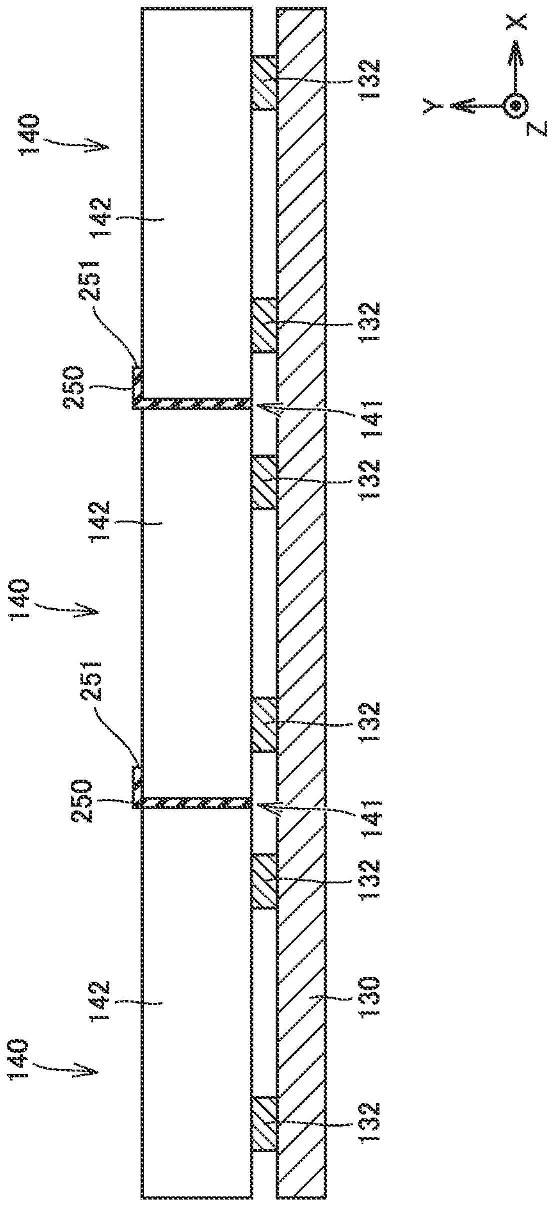
FIG. 9 is a cross-sectional view showing a partial configuration of a stationary induction apparatus according to a second embodiment of the present invention.

FIG. 9 is a cross-sectional view showing a partial configuration of the stationary induction apparatus according to the second embodiment of the present invention. FIG. 9 shows the same cross section as that of stationary induction apparatus 100 according to the first embodiment of the present invention shown in FIG. 4.

As shown in FIG. 9, in the present embodiment, an insulating member 250 is positioned in gap 141. Thus, insulating member 250 is sandwiched between a plurality of magnetic shields 140 adjacent to each other, whereby the length of gap 141 can be easily controlled.

Insulating member 250 has a pawl 251 for preventing a portion positioned in gap 141 from dropping. In the present embodiment, pawl 251 is provided on the opposite side to the side closer to support 130 of magnetic shield 140 but may be provided on the side closer to support 130 of magnetic shield 140. Insulating member 250 does not necessarily have pawl 251 and may be simply positioned in gap 141.

Insulating member 250 is formed of, for example, a nonmetal material, specifically, formed of pressboard.

In the foregoing embodiments, mutually combinable configurations can be combined as appropriate.

The foregoing embodiments disclosed here are illustrative in all respects and are not intended to provide a basis for limited interpretation. The technical scope of the present invention should not be interpreted only with the foregoing embodiments. All modifications that come within the meaning and range of equivalence to the claims are embraced here.

REFERENCE SIGNS LIST

100 stationary induction apparatus, 101 tank, 110 core, 120 winding, 121 high voltage winding, 122 low voltage winding, 130 support, 131 shield support surface, 132 fixing portion, 132A, 132B side surface, 140 magnetic shield, 141 gap, 142 electromagnetic steel plate, 143 one end, 144 the other end, 145 conductive wall, 190 other magnetic shield, 250 insulating member, 251 pawl, B leakage flux, $B_1$, $B_9$ first leakage flux, $B_2$ second leakage flux, $I_1$ first eddy current, $I_2$ second eddy current, X axial direction, Y normal direction, Z stacking direction.

The invention claimed is:

1. A stationary induction apparatus comprising:

a core;

a winding wound around the core as a center axis;

a support formed of a nonmagnetic material, the support extending between the winding and the core in an axial direction of the center axis and supporting the core; and a plurality of magnetic shields positioned between the winding and the support on an opposite side to a side closer to the core of the support, wherein the support has a shield support surface positioned on the opposite side to the side closer to the core, on the shield support surface, a plurality of fixing portions are provided to be spaced apart from each other in the axial direction, the fixing portions fixing each of the magnetic shields, each of the fixing portions is formed of a nonmagnetic material, the magnetic shields are arranged to be aligned in the axial direction with a gap therebetween, and each of the magnetic shields is formed with a plurality of electromagnetic steel plates stacked in a direction vertical to each of the axial direction and a normal direction to the shield support surface, a shortest spacing distance between each of the magnetic shields and the support is twice or more a length of the gap between magnetic shields adjacent to each other in the magnetic shields, and the magnetic shields are not in contact with one another.

2. The stationary induction apparatus according to claim 1, wherein each of the fixing portions extends across the entire length of each of the magnetic shields in a stacking direction of the electromagnetic steel plates and fixes the electromagnetic steel plates to each other, each of the magnetic shields has one end and the other end in the axial direction, each of the magnetic shields is fixed to the shield support surface by at least two fixing portions aligned along the axial direction as the fixing portions, the dimension of a length between the one end and a side surface on a side closer to the one end in a fixing portion positioned closest to the one end of the at least two fixing portions in the axial direction is greater than the dimension of a height of each of the magnetic shields in the normal direction to the shield support surface, and the dimension of a length between the other end and a side surface on a side closer to the other end of a fixing portion positioned closest to the other end of the at least two fixing portions in the axial direction is greater than the dimension of a height of each of the magnetic shields in the normal direction to the shield support surface.

3. The stationary induction apparatus according to claim 1, wherein the magnetic shields are configured such that a magnetic flux density of a magnetic field passing through the gap between magnetic shields adjacent to each other in the magnetic shields in the axial direction is 0.5 T or less.

4. The stationary induction apparatus according to claim 2, wherein the magnetic shields are configured such that a magnetic flux density of a magnetic field passing through the gap between magnetic shields adjacent to each other in the magnetic shields in the axial direction is 0.5 T or less.

5. The stationary induction apparatus according to claim 1, wherein an insulating member is arranged in the gap.

6. The stationary induction apparatus according to claim 2, wherein an insulating member is arranged in the gap.

7. The stationary induction apparatus according to claim 3, wherein an insulating member is arranged in the gap.

8. The stationary induction apparatus according to claim 4, wherein an insulating member is arranged in the gap.

* * * * *